United States Patent
Oury

(10) Patent No.: US 7,520,697 B2
(45) Date of Patent: Apr. 21, 2009

(54) SYSTEM AND METHOD FOR ELEVATING A SUPPORT POST

(75) Inventor: Robert F. Oury, Gilberts, IL (US)

(73) Assignee: Rotec Industries, Inc., Elmhurst, IL (US)

( * ) Notice: Subject to any disclaimer, the term of this patent is extended or adjusted under 35 U.S.C. 154(b) by 1130 days.

(21) Appl. No.: 10/784,364

(22) Filed: Feb. 23, 2004

(65) Prior Publication Data

US 2004/0168860 A1     Sep. 2, 2004

Related U.S. Application Data

(60) Provisional application No. 60/450,398, filed on Feb. 26, 2003.

(51) Int. Cl.
  *E02D 5/00*     (2006.01)
(52) U.S. Cl. ................ 405/229; 405/233; 248/354.2
(58) Field of Classification Search .......... 405/107, 405/116, 229, 233, 290; 248/354.2
  See application file for complete search history.

(56) References Cited

U.S. PATENT DOCUMENTS

| | | | | | |
|---|---|---|---|---|---|
| 3,521,415 | A | * | 7/1970 | Vartia | 248/354.2 |
| 4,405,262 | A | * | 9/1983 | Nagashima | 405/221 |
| 4,846,580 | A | * | 7/1989 | Oury | 366/27 |
| 5,699,878 | A |   | 12/1997 | Oury et al. | |
| 5,762,179 | A |   | 6/1998 | Oury et al. | |
| 6,336,545 | B1 |   | 1/2002 | Arndt et al. | |
| 7,191,569 | B2 | * | 3/2007 | Brown | 52/293.3 |

* cited by examiner

*Primary Examiner*—Frederick L Lagman
(74) *Attorney, Agent, or Firm*—Pauley Petersen & Erickson

(57) ABSTRACT

A system and method for elevating a construction implement relative to a surface under construction includes erecting a support post having a generally hollow cavity on the surface under construction, such as a dam. A quantity of granular material is then dumped into the hollow cavity of the support post. The support post and, specifically, the construction implement, is then jacked to a desired height relative to the surface. A portion of the granular material is then permitted to disperse through and beneath the support post thereby creating a higher support structure on which the support post may then rest. This process may be repeated as the construction progresses and the surface is gradually raised.

18 Claims, 5 Drawing Sheets

SYSTEM AND METHOD FOR ELEVATING A SUPPORT POST

This application claims priority to U.S. provisional application 60/450,398 filed 26 Feb. 2003.

BACKGROUND OF THE INVENTION

1. Field of the Invention

This invention relates to a system and method for elevating a support post relative to a surface of a structure under construction.

2. Description of Related Art

Dams and similar large scale construction projects that require building up a surface are traditionally built in layers ranging from two feet to six feet in depth. Concrete and rock filled dams are traditionally constructed by hauling rocks and concrete from a blasting site, concrete plant or quarry to the dam site using large dump trucks and/or mixing trucks. In rock filled dams, a bulldozer then spreads the rocks and rollers are used to compact the material until it reaches a specified density. Similarly, in concrete construction, a cantilevered trough pours the concrete until it reaches a desired level.

Bulldozers and trucks also typically prepare roads on the dam so that trucks can drive on successive layers safely and without damaging tires and suspensions. This process is costly and time consuming because numerous trucks are required to transport the material to the dam site. In some instances, traditional conveyors have also been used to transport the rocks and/or concrete to the dam site. However, because the level of the dam or similar structure rises as it is being built, the conveyors are traditionally repositioned and/or raised during construction. Repositioning and reinstalling the conveyors is time consuming and cost prohibitive in many instances.

One such manner of raising or jacking the conveyors and/or other construction equipment utilizes jacks that are mounted on support posts to raise the conveyor and/or other construction equipment. In this respect, the mechanisms and techniques disclosed in U.S. Pat. No. 5,699,878, the disclosure of which is hereby incorporated by reference, may be used to elevate the conveyor. Such a jacking operation may have the disadvantage of requiring an additional operation of making and/or transporting heavy concrete collars used to support and maintain the support posts during and after the jacking operation.

Therefore, a need exists for a system and method of elevating a support post relative to a surface of a structure under construction with minimal investment in infrastructure.

SUMMARY OF THE INVENTION

This invention relates to a system and method for elevating a post relative to a surface of a structure under construction wherein the post (hereinafter a "support post") supports construction equipment such as a conveyor, crane, towerbelt, boom conveyor, PORT-O-BELT™ swinger or similar such equipment, particularly concrete and aggregate material handling equipment, necessary in large scale construction projects such as dams, embankments, landfills, land reclamation and similar such projects.

According to a preferred embodiment of this invention, a system for elevating a construction implement relative to a surface of a structure under construction includes a support post having a generally hollow cavity along a center axis. The support post is preferably erected at the outset of construction within a concrete foundation and/or a hole in the surface of the construction site so that the sidewalls of the support post are capable of sliding relative to the foundation and/or hole.

The support post preferably includes a feed inlet or similar opening into the generally hollow cavity in addition to one or more flanges positioned around the support post. The flanges preferably protrude from the support post so as to provide an interference or interface with a jack. In addition, an outlet is preferably positioned at a lower end of the support post and comprises a choke that includes a diameter smaller than a maximum inner diameter of the support post.

A quantity of granular material is preferably provided into the support post, preferably through the feed inlet. The granular material preferably comprises pea gravel or similar material with fairly predictable flow characteristics.

Two or more jacks are then positioned relative to the support post and used to elevate the support post and thus the construction implement relative to the surface of the structure under construction. Each jack is preferably aligned between the flange formed along the support post and the surface of the structure under construction. Therefore, as the jack is raised against the flange, the support post is elevated relative to the surface. Following elevation, the granular material is partially evacuated from the outlet of the support post and thereby fills in the void created by the elevated support post.

Accordingly, a method using the above-described system preferably includes erecting the support post in an initial position. The structure and/or surface is then built up around the support post following which the conveyor or similar construction implement must be raised to a working elevation. The granular material is then provided into the support post using a suitable transport means. Following a fill or partial fill of granular material into the support post, the support post is jacked relative to the surface of the construction site. As this occurs, the granular material flows from the bottom of the support post and fills the void thereby created in the foundation and/or the hole in the surrounding rock. The support post is then set back down on the granular material resulting in compaction of the granular material thereby developing a new supporting structure for the support post. This method may thereafter be repeated depending upon the ultimate height of the surface of the structure under construction.

It is one object of this invention to elevate a construction implement relative to a surface under construction. This and other objects of this invention will be apparent from the above and following description of the subject invention.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
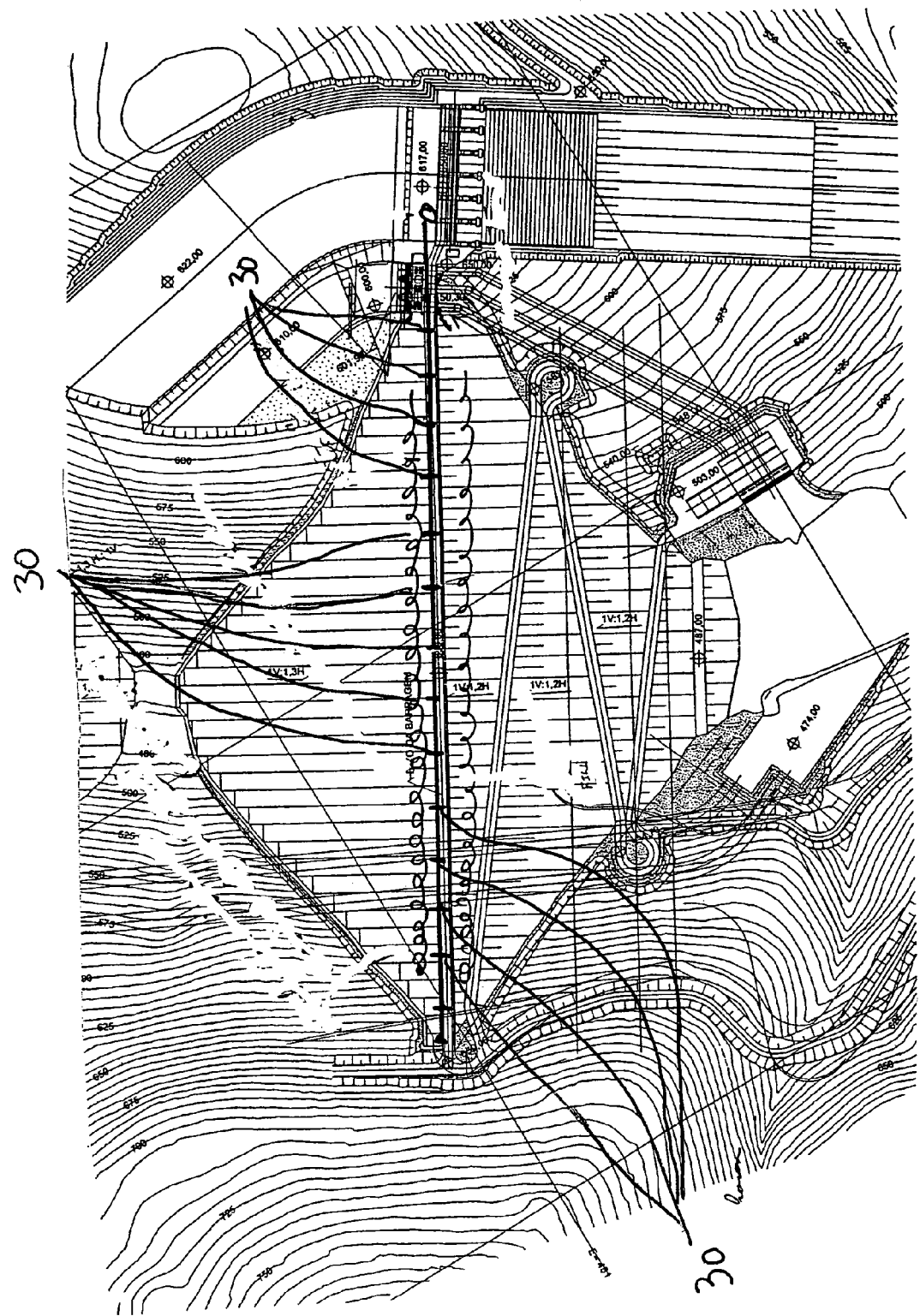
FIG. 1 is a plan view of a dam site.

As briefly described thus far, large scale construction projects such as dams, embankments, landfills, land reclamation and similar such projects may require repositioning and/or elevation of support posts used in material handling construction implements on the job site. FIG. 1 shows a plan view of a typical dam construction site wherein support posts are positioned along the center line of the dam. A conveyor or similar material handling device is typically installed only one time, and preferably includes a mechanism for raising the conveyor as the dam is constructed.

In a typical application, the conveyor will extend transversely across a river on which the dam is to be constructed. In a typical operation, the conveyor is used to windrow stockpiles of material, such as rocks or concrete, along a span of the conveyor. Using the conveyor or similar construction implement, the centerline of the dam is necessarily built up higher as the project progresses.

Figure 2:
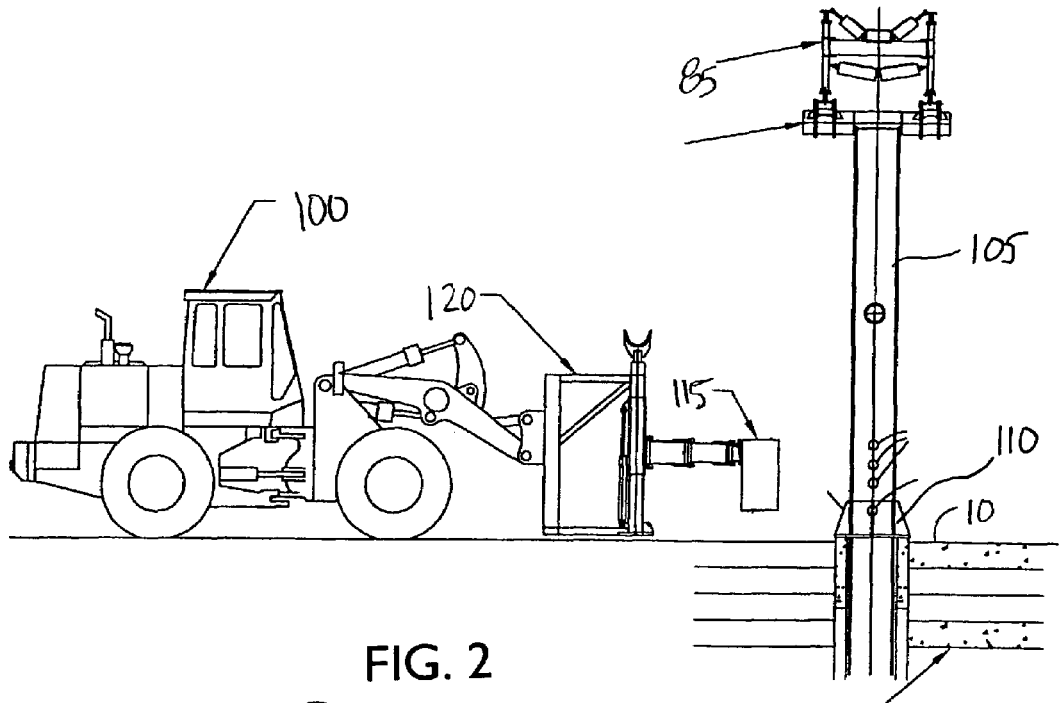
FIG. 2 shows a method of elevating a support post according to the prior art.

As described briefly above, existing systems for elevating construction implements relative to a surface under construction utilize concrete or similar segmented supports 115 that are wrapped around a support post 105 having a collar 110 prior to a jacking operation. A multi-loader 100 is used to both place the support 115 and position a jack frame 120. A representative drawing of this operation is shown in FIG. 2, taken from U.S. Pat. No. 5,699,878 and incorporated herein by reference. Such collars 110 and supports 115 typically require a secondary manufacturing and/or moving operation and are often left within the structure under construction, such as a dam.

Figure 3:
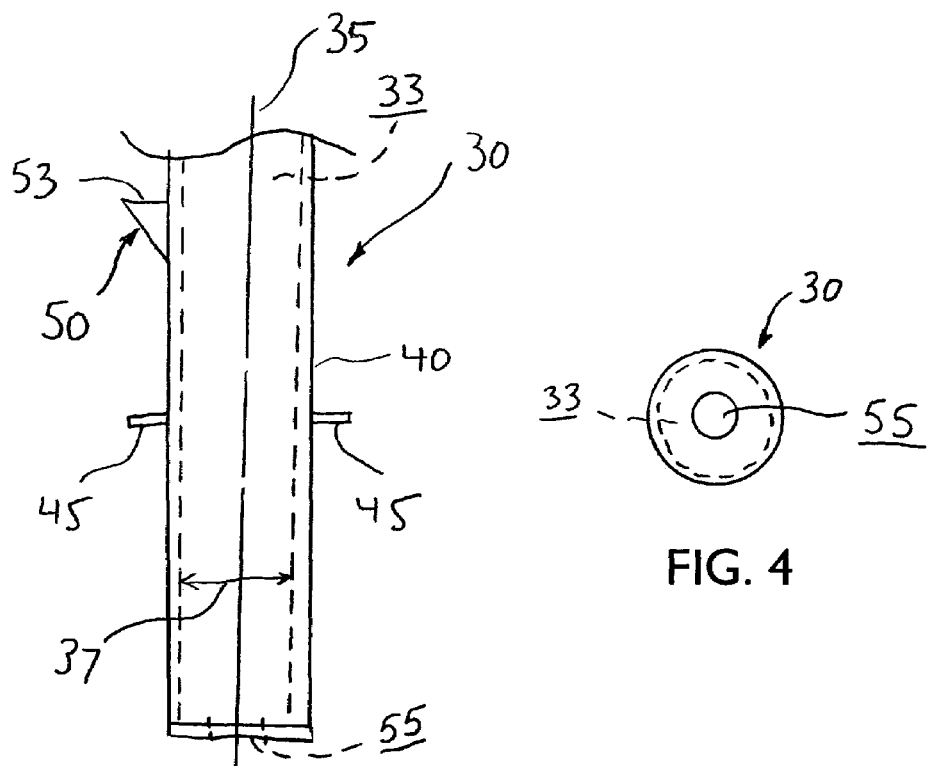
FIG. 3 is a side view of a portion of a support post according to one preferred embodiment of the invention.
Figure 4:
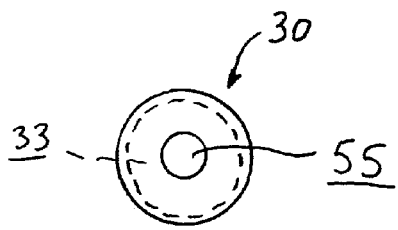
FIG. 4 is a bottom view of the support post shown in FIG. 3, particularly showing an outlet of the support post.
Figure 5:
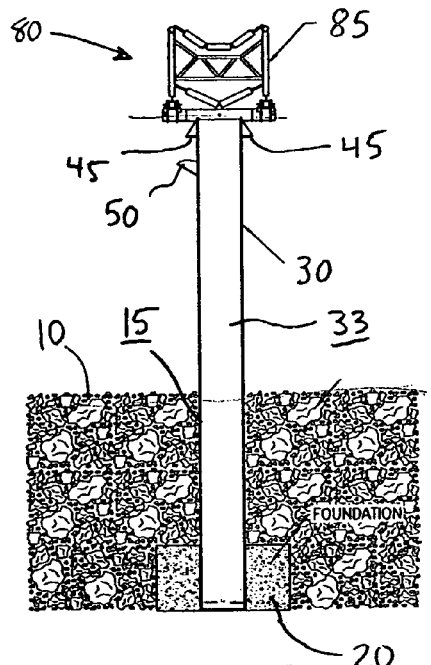
FIG. 5 is a side view of a support post and a conveyor prior to elevation according to one preferred embodiment of the invention.
Figure 7:
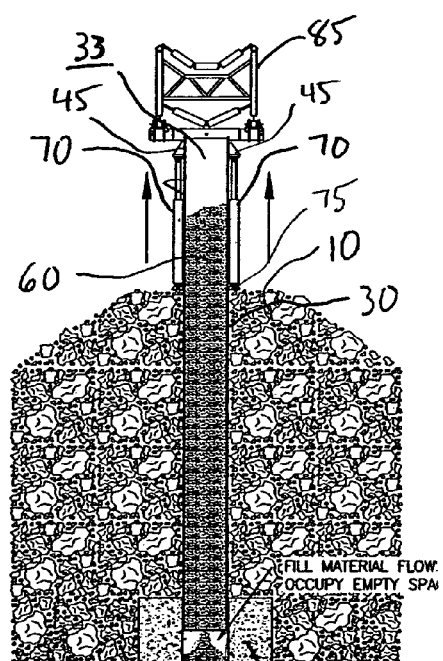
FIG. 7 is the support post of FIG. 6 being jacked upwardly to raise the conveyor as the construction surface is raised.
Figure 8:
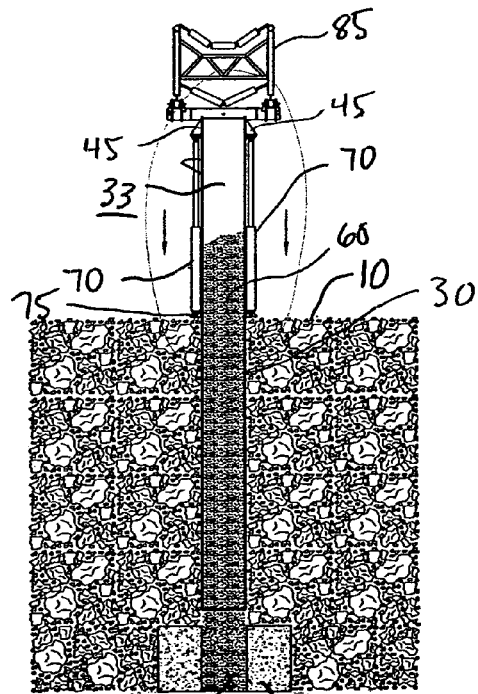
FIG. 8 is the support post of FIG. 7 being lowered on the granular material.
Figure 9:
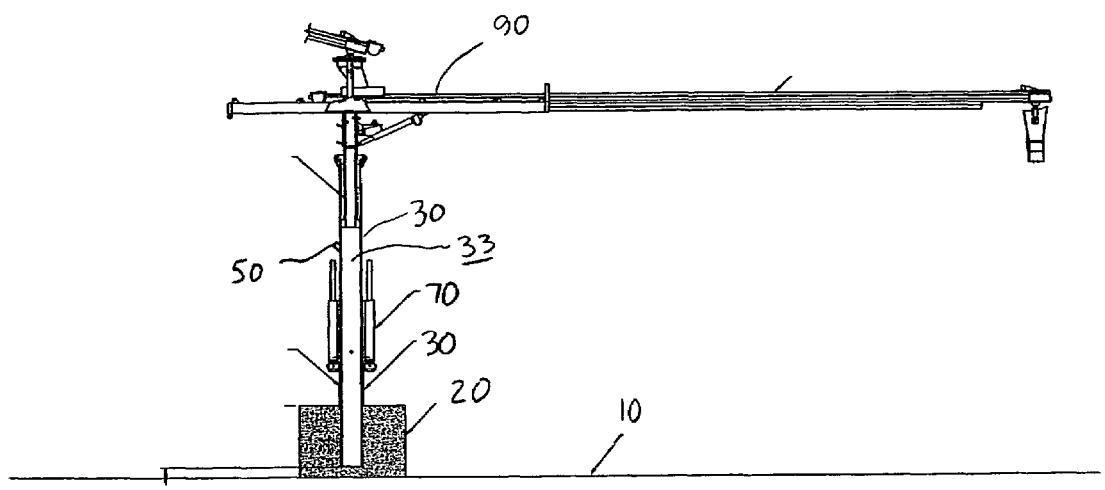
FIG. 9 is a side view of a support post and a boom conveyor prior to elevation according to one preferred embodiment of the invention.

FIGS. 3-11 show a system for elevating a construction implement relative to a surface 10 of a structure under construction. The surface 10 preferably initially includes a hole 15 formed therein, such as shown in FIG. 5, and/or a foundation 20 placed or formed thereon, such as shown in FIG. 9. The foundation 20 and/or hole 15 on or in the surface 10 of the structure serve to provide an initial means for support for support post 30. The support post 30 is thus erected within foundation 20 and/or hole 15 on or in the surface 10, thereby providing support for a suitable construction implement 80.

The construction implement 80 may include a conveyor 85, crane, towerbelt, boom conveyor 90, PORT-O-BELT swinger, cantilevered feed trough or similar such equipment, particularly concrete and aggregate material handling equipment, necessary in large scale construction projects. Although shown in the drawings and described herein, the support post 30 may be used to accommodate not only conveyors 85 and boom conveyors 90 but also any other suitable construction implement 80 known to those having ordinary skill in the art, preferably material handling construction implements. As will be appreciated and as shown in FIG. 1, a conveyor 85 may include a plurality of such support posts 30 spaced along its length.

FIGS. 3 and 4 show the support post 30 according to one preferred embodiment of this invention. The support post 30 preferably includes a generally hollow cavity along a center axis 35 and surrounding sidewalls 40. The support post 30 is preferably a hollow steel structure but may be any suitable material that possesses adequate strength to support construction implements 80 and the applied loads generally encountered on constructions projects such as those described herein.

The support post 30 is thus positioned within the hole 15 and/or the foundation 20 so that sidewalls 40 of the support post 30 generally conform with inner walls of the hole 15 and/or the foundation 20. In the case of a poured or cast foundation 20, the support post 30 may be prepositioned within a mold and concrete poured and set around a base of the support post 30. However, the support post 30 should be slidingly engaged with the hole 15 and/or the foundation 20. Specifically, the sidewalls 40 of the support 30 should slide relative to the hole 15 and/or the foundation 20. One manner of permitting a sliding engagement between the support post 30 and the foundation 20 and/or hole 15 is to wrap the support post 30 with a low friction material such as ¼" polyethylene foam sheet, at least along the interface between the support post 30 and the foundation 20 and/or hole 15.

According to one preferred embodiment of this invention shown in FIG. 3, the support post 30 may include a feed inlet 50 provided in the support post 30. The feed inlet 50 may comprise a spout 53, funnel or similar arrangement or may merely comprise an opening in an upper end and/or sidewall 40 of the support post 30.

In addition, the support post 30 may further include one or more flanges 45 positioned around the support post 30. The flanges 45 preferably protrude from the support post 30 so as to provide an interference, attachment and/or interface with a jack 70, as described below.

According to one preferred embodiment of this invention shown in FIG. 4, an outlet 55 is positioned at a lower end of the support post 30. The outlet 55 may comprise a cap or a welded or otherwise attached choke that is positioned at the lower end of the support post 30 and preferably includes a diameter smaller than a maximum inner diameter 37 of the support post 30.

According to a preferred embodiment of this invention, and as described in more detail below, a quantity of granular material 60 is preferably provided through and into the support post 30, such as through the feed inlet 50. The granular material 60 preferably comprises pea gravel, sand or similar aggregate having a generally small diameter with a fairly predictable flow characteristic. Preferred pea gravel is washed, number 8 (10 mm) gravel. Regardless of the specific material used as granular material 60, one preferred characteristic is the avoidance of binding or sticking within the granular material 60, particularly when the granular material 60 is poured, siphoned or otherwise flowing.

At least one jack 70, and preferably two or more jacks 70, are positioned relative to the support post 30 and used to elevate the support post 30 and thus the construction implement 80 relative to the surface 10 of the structure under construction. Jacks 70 are preferably hydraulic in operation but may be of any construction known to those having ordinary skill in the art. As shown in FIGS. 5-12, multiple jacks 70 maybe positioned within a jack frame 75 that is moved into position around the support post 30 using a multi-loader 100.

Each jack 70 is preferably aligned between the flange 45 formed along the support post 30 and the surface 10 of the structure under construction. Therefore, as the jack 70 is raised against the flange, the support post 30 is elevated relative to the surface 10. Lower ends of the jacks 70 may be connected to a collar that surrounds the support post 30. Following elevation, the granular material 60 is partially evacuated from the outlet 55 of the support post 30 and thereby fills in the void created by the elevated support post 30.

Figure 6:
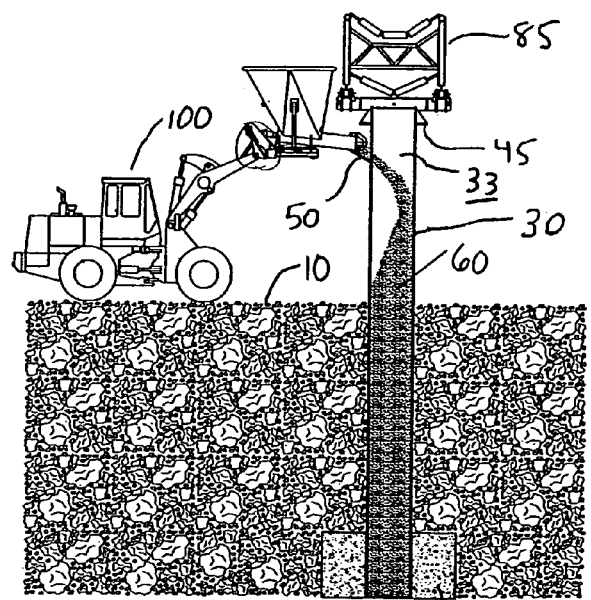
FIG. 6 is the support post of FIG. 5 being filled with granular material according to one preferred embodiment of this invention.

FIGS. 5-8 show a method for elevating the support post 30 and specifically a conveyor 85 according to a preferred embodiment of this invention FIG. 5 shows the support post 30 in an initial position subsequent to erection but prior to elevation. As represented in FIG. 5, the support post 30 includes a hollow, unfilled cavity 33 along the center axis of the support post 30. As shown in FIG. 6, following build-up of the surface 10 of the structure under construction, the support post 30 requires raising to bring the conveyor 85 to a working elevation. As further shown in FIG. 6, a multi-loader 100 having a front mounted hopper preferably provides the granular material 60 to the feed inlet 50 of the support post 30.

Although shown as a multi-loader 100 in the figures, the granular material 60 may be carried to the feed inlet 50 of the support post 30 through other means including a dump truck, conveyor, human laborers carrying individual sacks of granular materials 60 and/or the conveyor 85 positioned on the support post 30. An observation port (not shown) may be formed near a middle of the support post 30 to determine when a suitable volume of granular material 60 is dumped into the support post 30.

FIG. 7 shows a jacking operation following placement of one or more jacks 70 and/or the jack frame 75 around the support post 30. The jacks 70 preferably raise the support post 30 relative to the surface 10 thereby permitting the granular material 60 to evacuate below the support post 30. As this occurs, the granular material 60 flows from the bottom of the support post 30 and fills the void created by the support post 30 in the foundation 20 and/or the hole 15 in the surrounding rock. The support post 30 is then set back down on the granular material 60 as shown in FIG. 8. As the support post 30 is lowered down on the granular material 60, it compacts the granular material 60 thereby developing a new supporting structure for the support post 30. The support post 30 may be refilled with granular material 60 each time the construction implement 80 is raised, or alternatively, only as is required, e.g., as the granular material 60 becomes depleted. FIG. 8 shows the raised support post 30 following equalization of the granular material 60 beneath the support post 30 thereby permitting the support post 30 to rest on the granular material 60 in the raised state. The process or method shown in FIGS. 6-8 may thereafter be repeated depending upon the ultimate height of the surface 10 of the structure under construction.

Figure 10:
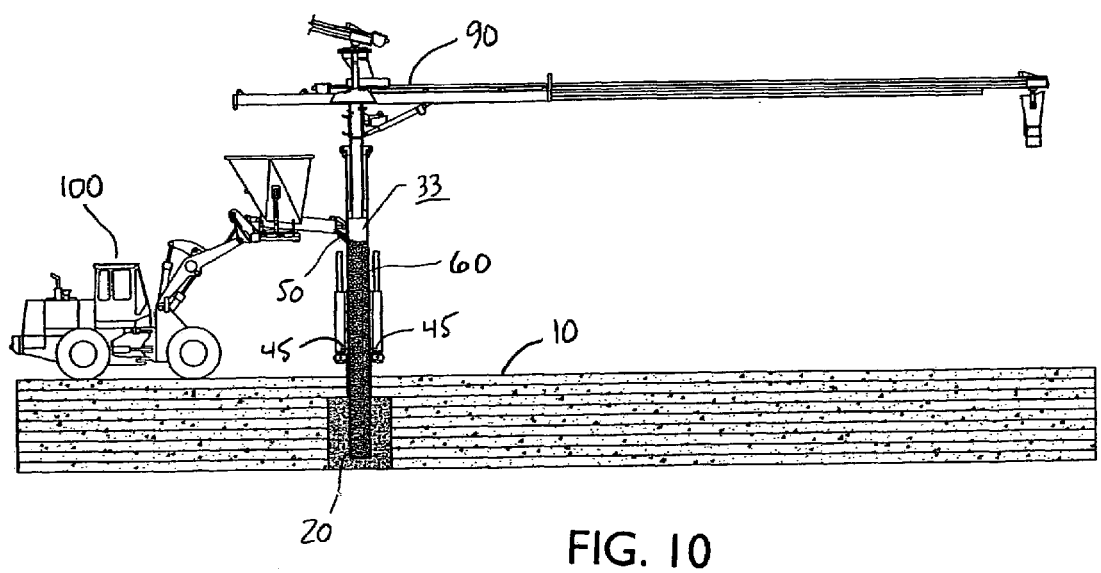
FIG. 10 is the support post of FIG. 9 being filled with granular material according to one preferred embodiment of this invention.

FIGS. 9-12 show a similar method for elevating a construction implement 80, specifically a boom conveyor 90 or crane, relative to the surface 10 under construction. FIG. 9 shows the support post 30 erected on the surface 10 and placed into a foundation 20 through which the support post 30 is slideable. The support post 30 includes a generally hollow cavity 33 along the center axis. FIG. 10 shows a multi-loader 100 dumping a quantity of granular material into the hollow cavity 33 of the support post 30.

Figure 11:
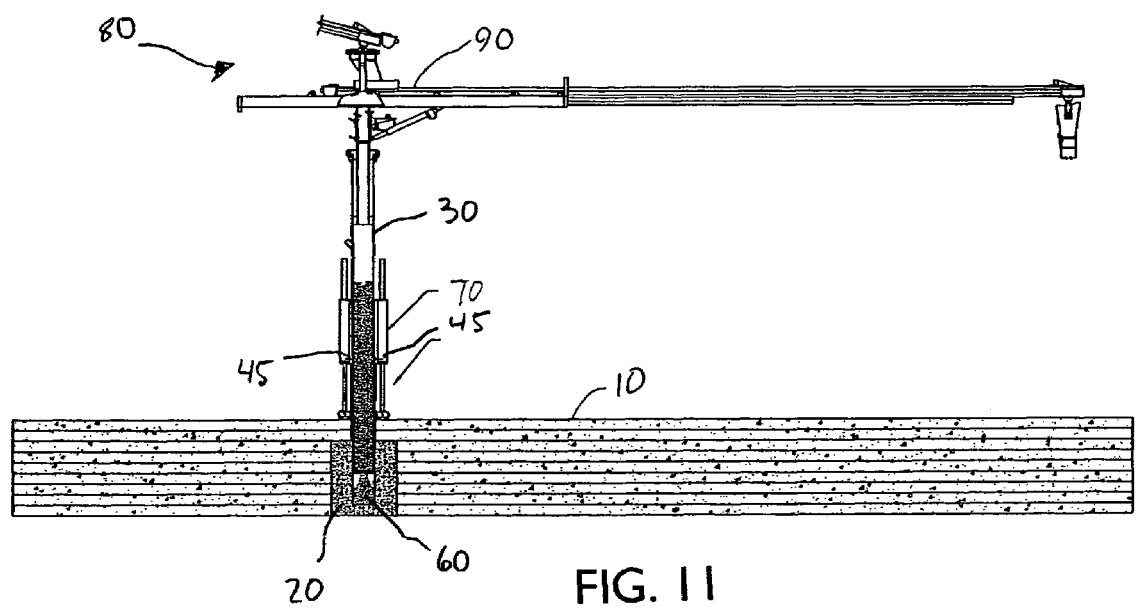
FIG. 11 is the support post of FIG. 10 being jacked upwardly to raise the boom conveyor as the construction surface is raised.
Figure 12:
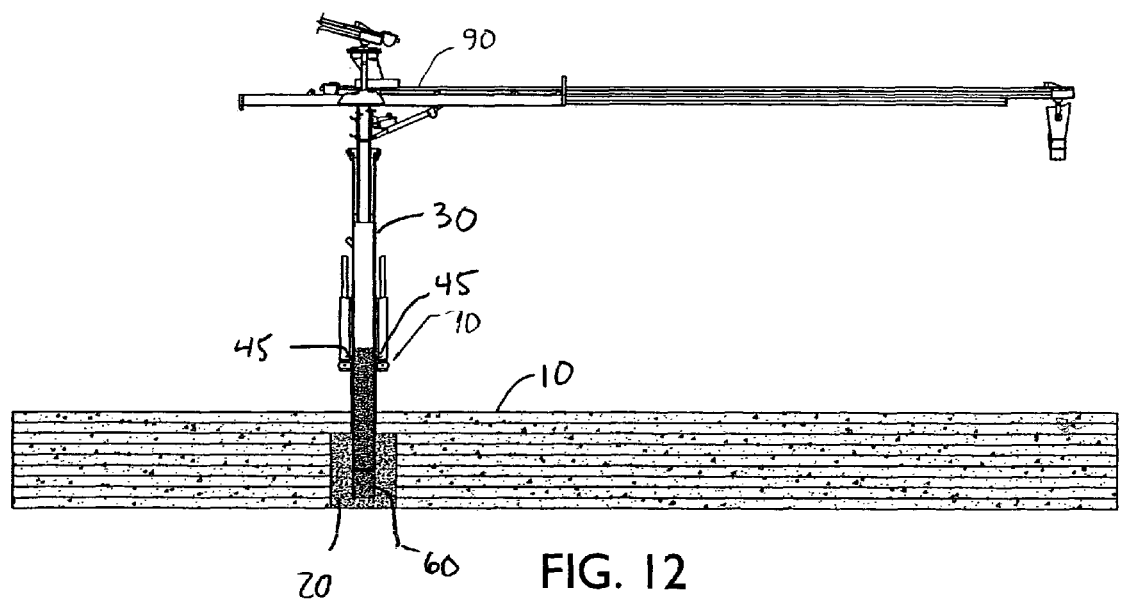
FIG. 12 is the support post of FIG. 11 being lowered on the granular material.

FIG. 11 shows several integrated jacks 70 attached to flanges 45 along the support post 30 jacking the support post 30 and thus the boom conveyor 90 relative to the surface 10. According to this preferred embodiment of the invention, a jack frame 75 such as shown in FIGS. 7 and 8 is unnecessary. The flanges 45 as shown are not necessarily attached along an upper portion of the support post 30 but instead toward a lower portion of the support post 30 to accommodate the substantial stroke length of the jacks 70. According to one preferred embodiment of this invention, the jacks 70 are capable of strokes of approximately 42" or more per jacking operation. Following elevation of the support post 30, the granular material 60 disperses beneath the support post 30 thereby creating a new, higher resting point for the support post 30 as shown in FIG. 12. This process may be repeated until completion of construction.

Following completion of the project, depending upon the composition of the structure, the support post 30 and the granular material 60 may be removed from the bore created by elevating the support post 30 or may be left in place.

Referring to FIG. 1, a rock filled dam may be constructed using a self raising conveyor 85, such as described herein, positioned along a center line of the dam. The conveyor 85 is preferably installed only one time and includes a mechanism for raising the conveyor 85 as the dam is constructed. In a typical application, the conveyor 85 will extend transversely across a river on which the dam is to be constructed. The conveyor 85 includes a tripping mechanism for distributing rocks carried by the conveyor 85 on either lateral side of the conveyor 85, e.g., both upstream and downstream of the conveyor 85. The tripping mechanism can be moved along the length of the conveyor 85 for distributing rocks along the length of the conveyor 85.

In operation, the conveyor 85 may be used to windrow stockpiles of material on either side of the conveyor 85. The material is then spread using large bulldozers. As the material is being spread, the smaller aggregate will typically be deposited first which is advantageous because the placing of the larger aggregate towards the back side of the dam reduces erosion. The bulldozers also function to compact the material as the material is being distributed by the bulldozer. Using the conveyor 85, the centerline of the dam can be built up higher so that the material that is windrowed can be bulldozed on a downward grade. Moving the material on a downhill grade makes it easier to manipulate larger pieces of rock when compared with traditional dam building methods where the dams are built in horizontal layers of rock.

As briefly described above, the jacks 70 may be permanently mounted on the support posts 30 or may be removable and installed only when it is necessary to raise the construction implement 80. The jacking operation can advantageously be performed while the conveyor 85 or similar construction implement 80 is operating, thereby reducing construction down time. Where required, the conveyor 85 can be used to move material up and down embankments more efficiently than trucks. This is because the energy required going uphill is offset by the energy generated when the material moves downhill. Only the net effect plus friction must be paid for in terms of electric demand.

While in the foregoing specification this invention has been described in relation to certain preferred embodiments thereof, and many details have been set forth for purpose of illustration, it will be apparent to those skilled in the art that the system and method according to this invention are susceptible to additional embodiments and that certain of the details described herein can be varied considerably without departing from the basic principles of the invention.

I claim:

1. A system for elevating a construction implement relative to a surface of a structure under construction, the surface having a hole formed therein, the system comprising:

a support post having a generally hollow center axis, the support post positioned within the hole so that sidewalls of the support post generally conform with inner walls of the hole;

a feed inlet provided in the support post;

a quantity of granular material provided through the feed inlet and into the support post; and at least one jack for elevating the support post and thus the construction implement relative to the surface of the structure under construction.

2. The system of claim 1 further comprising:

a outlet positioned at a lower end of the support post, the outlet having a diameter smaller than an inner diameter of the support post.

3. The system of claim 1 wherein the feed inlet comprises a spout positioned at an upper end of the support post.

4. The system of claim 1 wherein the granular material comprises pea gravel.

5. The system of claim 1 further comprising:

a flange formed along a sidewall of the support post, the jack positioned between the surface of the structure and the flange to enable the elevation of the support post relative to the surface.

6. The system of claim 1 further comprising:

a loader;

a hopper connected to the front of the loader and providing the granular material to the feed inlet of the support post.

7. The system of claim 1 wherein the construction implement comprises at least one of a conveyor apparatus; a boom conveyor and a crane.

8. The system of claim 1 wherein the conveyor apparatus provides the granular material to the feed inlet of the support post.

9. A method for elevating a construction implement relative to a surface under construction, the method comprising the steps of:

erecting a support post on the surface, the support post having a generally hollow cavity along a center axis;

dumping a quantity of granular material into the hollow cavity;

jacking the support post and thus the construction implement relative to the surface; and permitting a portion of the granular material to disperse beneath the support post.

10. The method of claim 9 further comprising the step of:

allowing a bottom portion of the support post to rest on the granular material beneath the support post.

11. The method of claim 9 further comprising the steps of:

providing a hole in the surface; and erecting the support post within the hole.

12. The method of claim 9 further comprising the steps of:

providing a concrete foundation on the surface; and erecting the support post within the concrete foundation.

13. The method of claim 9 further comprising the steps of:

capping a lower end of the support post with an outlet having a diameter smaller than an inner diameter of the support post.

14. The method of claim 9 further comprising the step of:

choking the dispersal of the granular material from the bottom of the support post.

15. The method of claim 9 wherein the granular material is poured through a food inlet provided in the support post.

16. The method of claim 9 further comprising:

positioning the jack between a flange formed in the upper surface of the support post and the surface of the structure to enable the elevation of the support post relative to the surface.

17. The method of claim 9 further comprising the step of:

pouring the granular material into the support post using a loader having a front-mounted hopper.

18. The method of claim 9 further comprising the step of:

providing the granular material into the support post using a conveyor apparatus attached to a top of the support post.

* * * * *